April 22, 1924.

H. CROSS ET AL

GIN

Filed April 23, 1921    3 Sheets-Sheet 1

1,490,915

Inventors
Herbert Cross
André Korowski

April 22, 1924.
H. CROSS ET AL
GIN
Filed April 23, 1921
1,490,915
3 Sheets-Sheet 2
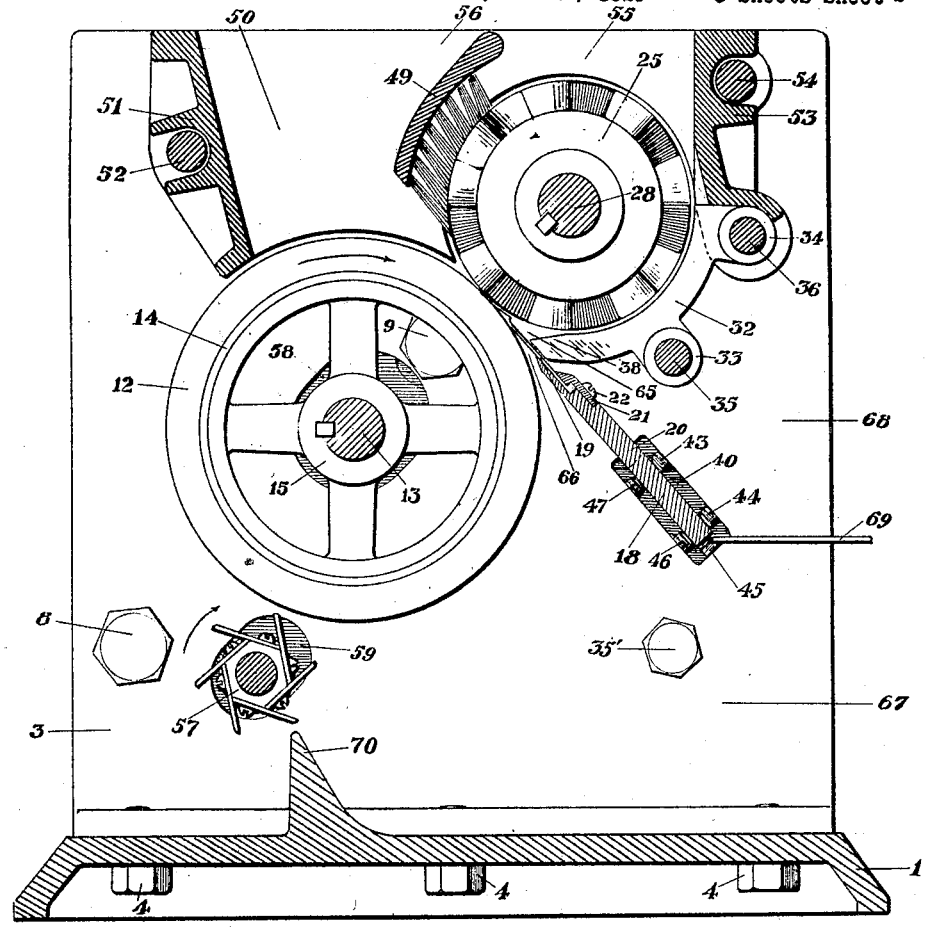
Fig. 2
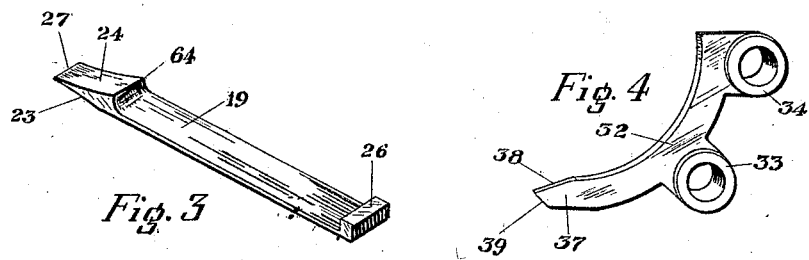
Fig. 3
Fig. 4
Inventors
Herbert Cross
André Koronski April 22, 1924.

H. CROSS ET AL

GIN

Filed April 23, 1921    3 Sheets-Sheet 3

1,490,915

Inventors
Herbert Cross
André Korowski

Patented Apr. 22, 1924.

1,490,915

UNITED STATES PATENT OFFICE.

HERBERT CROSS, OF CYNWYD, AND ANDRÉ KORONSKI, OF NARBERTH, PENNSYLVANIA.

GIN.

Application filed April 23, 1921. Serial No. 463,941.

*To all whom it may concern:*

Be it known that we, HERBERT CROSS and ANDRÉ KORONSKI, citizens of the United States, residing, respectively, at Cynwyd and Narberth, both situate in the county of Montgomery and State of Pennsylvania, have invented certain Improvements in Gins, of which the following is a specification.

Our invention relates to improvements in gins for ginning any kind of cotton, but especially for ginning short staple cotton such as is now ginned with saw gins and to gin it in such a way as to eliminate the disadvantages of the use of saw gins.

The first object is to provide a gin which will gin short staple cotton without the use of saws or similar mechanisms which injure the fibre.

A second object is to provide a gin which will gin the cotton without breaking or cutting the fibre and which will hence use the fibre to the best advantage.

A third object is to provide a gin which will take the fibre from the seeds and leave it straight and not "hooked" as is the case with saw gins.

A fourth object is to provide a gin which will remove all the fibre from the seeds in the one operation and so remove it that the seeds come practically delinted from the gin.

A fifth object is to eliminate the danger from accidental fire in the gin due to sparks given off by the saws when they strike stones, etc., which may have gotten into the gin with the cotton.

We obtain these results by the mechanism illustrated in the accompanying drawings and in which:

Fig. 2 is a side view of the gin with the end plate cut away. It is practically a section on the line 2—2 in Fig. 1.

Fig. 3 is a perspective view of one of the blades.

Fig. 4 is a perspective view of one of the grids.

Similar numerals refer to like parts in the various figures and in the specifications.

Figure 1:
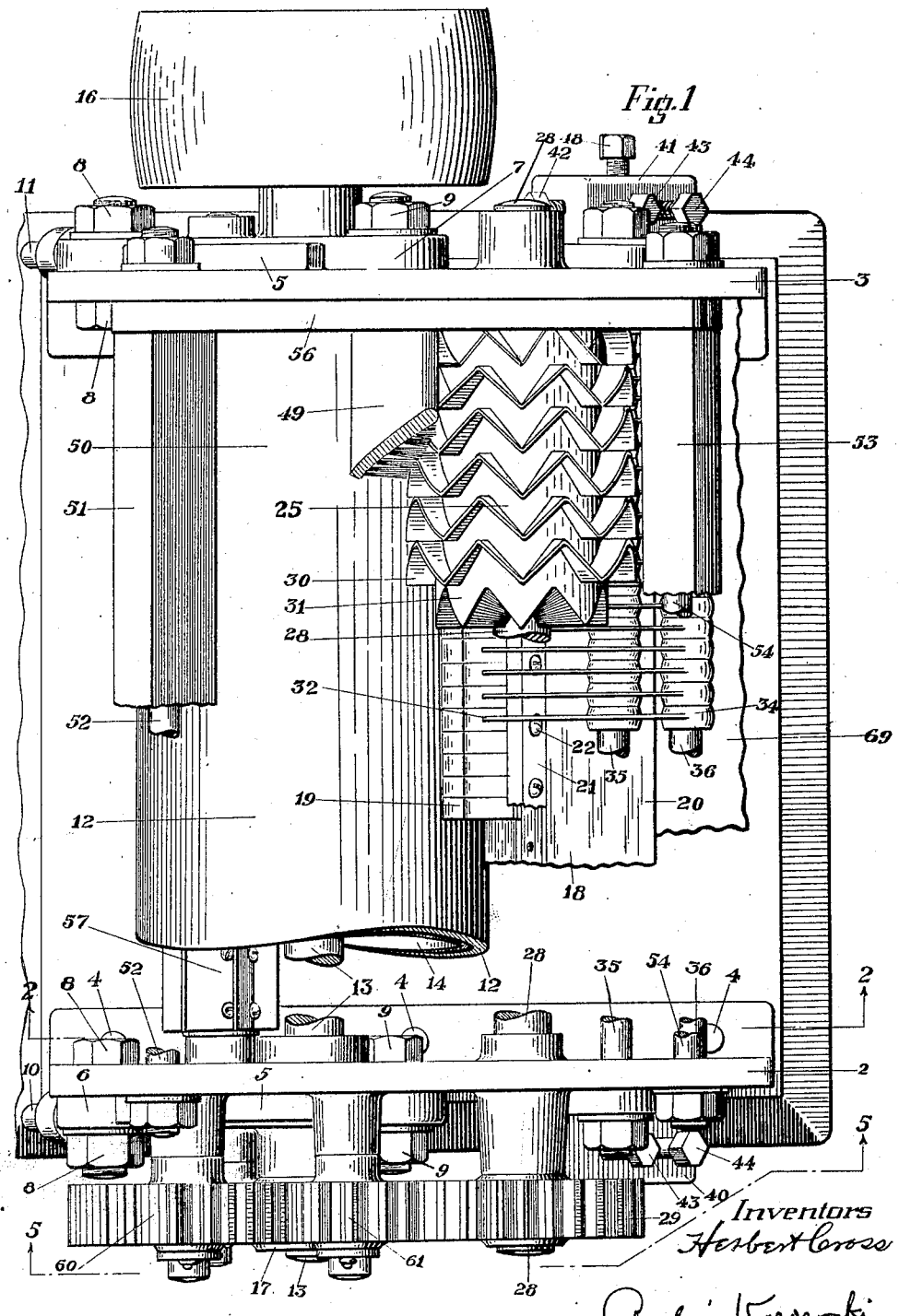
Fig. 1 is a top view of the gin with the various parts cut away successively to show their relative positions.

The base 1 has bolted to it the side frames 2 and 3 by means of the bolts 4. Integral with the side plates 2 and 3 are the gibs 5 and 6 which form a slide for the adjustable boxes 7 which are capable of sliding to a limited extent along the slot made by the gibs 5 and 6. The boxes 7 are bolted to the side frames 2 and 3 by the bolts 8 and 9 and the screws 10 and 11 form an adjustment for the said boxes 7.

The ginning roll 12 is supported on a shaft 13 by the sleeve or drum 14 which is attached to the spiders 15 of which there is one at each end. These are keyed to the shaft 13 which is supported in bearings in the boxes 7. At one end of the shaft 13 is the belt pulley 16 and at the other end is the gear 17 both keyed to said shaft. The ginning roll 12 is made preferably of walrus hide fastened to the metal sleeve 14, but it may be made of any other suitable friction material.

Figure 6:
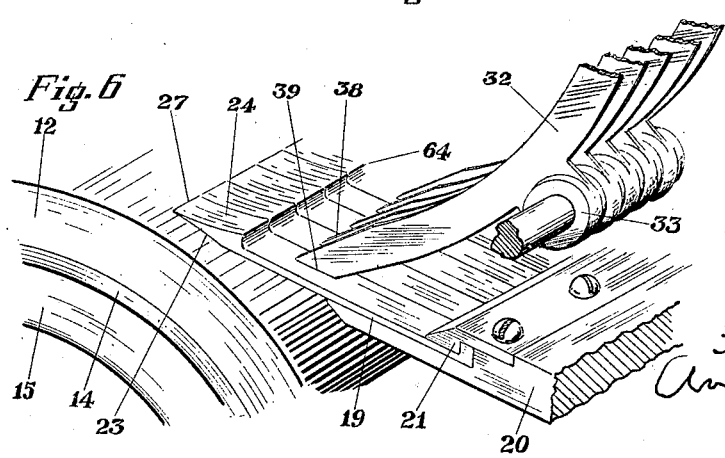
Fig. 6 is a perspective view of part of the ginning roll, the knife and the grids to show their relation to each other.

Contacting with the roll 12 is the knife 18 which is made up of blades shaped as shown in Figs. 2, 3 and 6 firmly held in a frame 20 by means of the clamp 21 and the screws 22. The blades 19 are about $\frac{3}{8}''$ wide and preferably made of steel hardened, and are ground to the same diameter as the roll 12 on the lower front face 23. The upper face 24 is ground to a slightly larger diameter than the feed roll 25, this face is about $\frac{3}{8}''$ long and is sloped off suddenly toward the rear as shown in Fig. 3. The shoulder 26 is simply a means of holding the blades 19 firmly in the holder 20. The edge 27 of the blade 19 is first made quite sharp and is then rounded smoothly over, giving it a rounded edge of very small radius and one which will not cut the fibre. Note that the edge is not turned over but is simply rounded.

The feed roll 25 is keyed to the shaft 28 which is supported in bearings in the side frames 2 and 3 and at one end has keyed to it the gear 29. The roll 25 is provided with zigzag flanges 30 as shown clearly in Fig. 1. They are made of sheet metal stamped to shape with castings 31 of the proper shape assembled between them on the shaft 28 as shown.

We prefer to make these flanges zigzag as shown but they may be simply straight blades set lengthwise radially in the face of the feed roll and other shaped flanges may be used altho the best results are obtained with the flanges shaped as shown. At each end of the roll 25 the alternate slant of the flanges of the end set are cut away so as to keep the cotton away from the sides.

Partly encircling and about 1/16" from the feed roll 25 are the grids 32. These are about 3/32" thick and cast with separating flanges 33 and 34 so as to leave a space of about 3/8" between them when assembled together. The grids are supported on the rods 35 and 36 which are fastened at the ends in the side frames 2 and 3, the said grids being assembled side by side the whole width of the gin. At the lower end 37 the grids fall away from the feed roll as shown at 38 in Figs. 2, 4 and 6 and the face 39 comes very close to, but not in actual contact with the upper side of the blades 19. This is clearly seen by comparing Figs. 1 and 2 and it allows the blades 19 a slight upward motion. The frame 20 which carries the blades is firmly held at each end by the holders 40 and 41 which are bolted to the frames 2 and 3 by the rod 35 and the bolt 35' and which have seven bolts 42, 43, 44, 45, 46, 47 and 48 each which permits the adjustment of the knife 18 in any direction.

Contacting with the feed roll 25 is the brush 49 which extends along its whole length. The back of the brush 49 forms one side of the hopper 50 into which the cotton is fed. The other side of the hopper is formed by the piece 51 which also serves to brace the side frames 2 and 3 by means of the bolt 52. Just above the grids 32 is the piece 53 held in place by the bolt 54 and which serves both as an additional brace for the side frames 2 and 3 and also as a plate to prevent the cotton and the seeds from falling over the top of the grids 32 as the cotton is brought around by the feed roll 25.

At each end of the hopper 50 and the chamber 55 are the plates 56 which overlap by about 1/4" the ends of the ginning roll 12 and the feed roll 25 so as to prevent the cotton from going into the bearings. The cut flanges on the roll 25 previously referred to tend to keep the cotton away from these side plates.

Situated below the ginning roll 12, but clearing it by about 1/8", is the rotary fan 57. This is pivoted in bearings in the boxes 7.

The side frames 2 and 3 are provided with slots 58 and 59 thru which the bearings for the shafts 13 and the fan 57 pass and are so shaped as to permit movement of these parts for adjustment.

Figure 5:
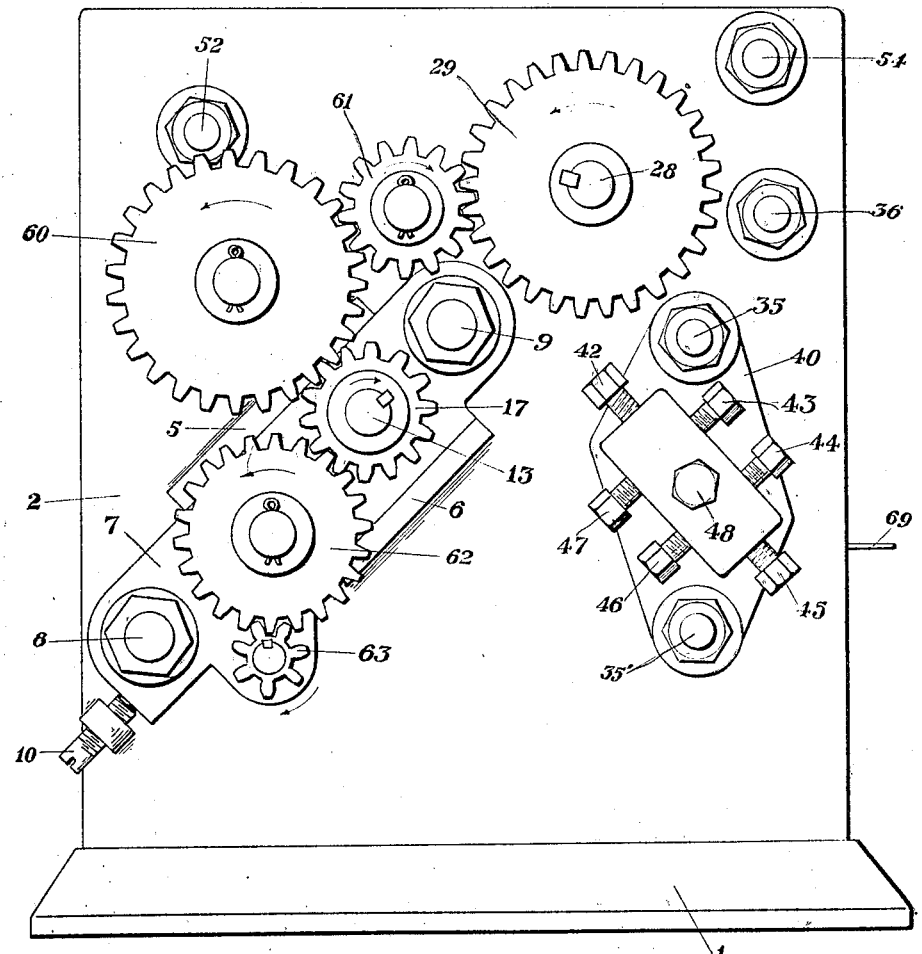
Fig. 5 is a side view of the gin in the direction of the arrows 5—5 in Fig. 1 showing the gears.

Referring to Fig. 5, the gear 17 meshes with the idler 60 which meshes with the idler 61 which in turn meshes with the gear 29 which drives the feed roll 25. With this combination of gears and the relative size of the gears 17 and 29, the ginning roll 12 and the feed roll 25 run in opposite directions and in the ratio of about 2 to 1. This arrangement of gears is provided for the purpose of providing a slight movement of the gear 17 and the parts moving therewith for the purpose of adjusting the ginning roll 12 relative to the feed roll 25.

The fan 57 is driven by the gear 17 thru the medium of the gears 62 and 63 the latter of which is keyed to the shaft of the fan 57.

The action of the gin is as follows:—The cotton is fed from a feeder into the hopper 50 (this has been made shallow in the drawings so as not to take up unnecessary space but may be any depth) which feeds it to the ginning roll 12 revolving at about 200 R. P. M., this drags the fibre under the blades 19 which have been so adjusted as to press to a certain extent on the ginning roll 12. At the same time, the motion of the feed roll 25 pulls the seed partly sideways and down until the seed is pulled past the edge 64 of the blades 19 into the space 65 and as the drum 25 moves relatively slowly, the cotton seed slips back giving the friction surface of the roll 12 a hold on other fibres. Such fibres as are removed from the seeds are drawn down thru the passage 66 into the chamber 67 from which they are drawn preferably by air suction. The fan 57 clears the drum 12 of any fibre which may be adhering to it.

Such seeds as are carried past the blades 19 by the action of the feed roll 25 are carried around by said roll and when in the chamber 55 expand or rise from said roll by the elasticity of the fibre and this tends to turn the cotton so it will present a new surface to the roll 12 when the feed roll 25 takes it down. The brush 49 brushes the cotton together, presses it again in contact with the roll 25 and straightens out the fibres before they again reach the ginning roll 12.

The action of the brush 49 is to lay the fibres out so they follow the seed and in a direction opposite to the rotation of the ginning roll 12. As the seed with its fibres laid out as above gets past the end of the brush the ginning roll 12 grasps the fibres by the ends and draws them under the edge of the knife 19. It has been found by experiment that the fibre adheres better to the ginning roll and is removed to better advantage when the said fibre is presented to the ginning roll against the direction of its rotation than when it is presented with the fibres pointing in the same direction.

So long as the seeds have any fibre on them they stick together and go around the feed roll 25 and each revolution brings them again in contact with the ginning roll 12 which removes more fibre, but when all the fibre is removed the seeds drop between the grids 32 into the chamber 68. The plate 69 is simply a means of separating the chambers 67 and 68 to keep the seeds and cotton separate. The lug 70 which is cast integral with the base 1 forms the rear of the chamber 67 and prevents the cotton from going in the wrong direction.

The cotton which comes into the chamber 67 is not tangled nor "hooked" but is straight with the fibres laid in one direction. The fibres are not cut but are removed from the seeds in their full length, the action of the blades 19, the ginning roll 12 and the feed roll 25 being practically to "shave" the fibre from the seed.

The object of using a number of blades side by side for a knife instead of one straight piece is to allow for layers of varying thicknesses of cotton passing under different parts of the knife and for inequalities in the face of the ginning roll. It practically gives the knife a blade which is flexible along its line of contact with the ginning roll 12. The motion of the blades 19 is limited by the end 39 of the grids 32 and at best this motion is very small and not enough to allow the fibre to get caught between adjacent blades which are grouped together as closely as possible without jamming.

It will be understood that variations upon any or all of the details shown herewith may be made without departing from the scope of the invention.

We know that friction drums have been used before in connection with a knife and grids, hence we do not claim such a combination broadly but we do claim the following:

1. In a device for removing cotton fibre from the seeds, the combination of a rotating friction surface, a knife made up of narrow sections grouped side by side contacting therewith, a feed roll, a series of grids and means for rearranging the cotton and seeds so additional fibres will be presented to said friction surface until all cotton is removed from the seeds.

2. In combination, a surface to which cotton fibre adheres to a certain extent, means cooperating with said surface, including a flexible sectional knife built up of narrow sections grouped side by side for severing said cotton fibre from the seeds, means for returning such seeds as have not had all the fibre removed back into contact with said friction surface and said severing means, and means for ejecting such seeds as have had all the fibre removed.

3. The combination of a friction surface, a flexible sectional knife built up of narrow sections grouped side by side cooperating with said friction surface to remove the fibre from the cotton seed and means for returning the seeds from which only part of the fibre has been removed back to where the remaining fibre can be removed by said friction surface and said knife.

4. The combination of a ginning roll rotating in a given direction, a knife contacting with said ginning roll, a feed roll cooperating with said ginning roll and knife to remove cotton fibre from the seed and rotating near said ginning roll and said knife but in the opposite direction to said ginning roll, a series of grids which allow the delinted seeds to escape the sphere of action of said ginning roll and a brush which arranges the fibres so they can be acted upon to better advantage by the ginning roll.

5. The combination of a friction surface, a flexible sectional knife built up of blade sections grouped side by side cooperating therewith to detach the cotton fibre from the seeds and a means, including a flanged feed roll, for returning such seeds as have had only part of the fibre removed to where the said friction surface and said knife cooperate until all the fibre is removed from the seed.

6. The combination of a moving friction surface, means cooperating with said surface, including a flexible sectional knife in which the sections are grouped side by side along the length of said friction surface and a feed roll, to detach the cotton fibre from the seed and means for returning the partly defibred seed to said fibre detaching means until all the fibre is removed from said seed.

7. The combination of a friction surface and means cooperating with said surface, including a knife with a flexible blade made up in narrow sections grouped side by side and a flanged feed roll, for removing the fibre from the cotton seeds.

8. The combination of a moving friction surface onto which the raw cotton and seeds are fed and means cooperating with said friction surface, including a knife built up of narrow sections arranged side by side, said knife being provided with a rounded operating edge and a flanged feed roll, for removing said cotton fibre from said seeds.

9. The combination of a ginning roll having a friction surface, a flexible knife made up of narrow sections grouped side by side with a rounded edge cooperating therewith, a feed roll having flanges for feeding and agitating the cotton and seeds, a brush cooperating with said feed roll to present unsevered and straightened fibres to said ginning roll and grids thru which the seeds are ejected after the fibre is completely removed from them.

10. The combination of a ginning roll, a knife cooperating therewith composed of narrow blade sections grouped side by side for the purpose of giving said knife flexibility along its line of cooperation with said ginning roll and means for feeding cotton to the point where the said knife cooperates with said ginning roll.

11. The combination of a feed roll, a ginning roll and a knife cooperating therewith with a brush cooperating with said feed roll for the purpose of laying out the fibres of the cotton carried around by said feed roll in a direction opposite to that of the direction of rotation of said ginning roll.

12. The combination of a ginning roll and a knife cooperating therewith to remove the cotton fibre from the seed said knife comprising a series of narrow blades assembled together side by side along the length of said ginning roll.

13. The combination of a ginning roll and a knife cooperating therewith to remove cotton fibre from the seed said knife comprising a series of narrow flexible blades assembled together side by side along the length of said ginning roll.

14. Means for removing cotton fibre from the seed including a knife made up of narrow sections grouped together so as to present a virtually flexible operating edge to a ginning roll which cooperates therewith for the purpose stated.

15. The combination of a ginning roll, a knife having a virtually flexible operating edge cooperating therewith to remove cotton fibre from the seed and means, including a brush, for presenting fibres not removed from the seed at first contact with the ginning roll and knife successively to said ginning roll and knife until all the fibre is removed.

16. The combination of a ginning roll, a knife cooperating therewith, means for bringing seeds from which all the fibre has not been removed back to where the ginning roll and the knife cooperate and a brush or similar means for laying out the fibre from such seeds in a direction opposite to that of the rotation of said ginning roll at the point where the said ginning roll cooperates with said knife.

17. The combination of a ginning roll, a knife provided with a virtually flexible operating edge cooperating therewith to remove cotton fibre from the seed and means for bringing back such seeds as have not had all the fibre removed to where said ginning roll and knife cooperate until all the fibre is removed.

18. The combination of a ginning roll, a knife provided with a virtually flexible operating edge cooperating therewith to remove cotton fibre from the seed and means, including a brush which brushes out the fibre of such seeds as have not had all the fibre removed, for bringing back these seeds to where said ginning roll and knife cooperate.

19. The combination of a ginning roll, a knife cooperating therewith the blade of which is made up of narrow sections so as to form a virtually flexible edge along the line of cooperation with said ginning roll to facilitate the removal of cotton fibre from the seed and means for bringing such seeds as have not had all the fibre removed back to where the ginning roll and knife cooperate.

20. The combination of a ginning roll, a knife cooperating therewith and built up of narrow blades so as to form a virtually flexible edge along the line of cooperation with said ginning roll thereby greatly facilitating removal of the cotton fibre from the seed and means for bringing back such seeds as have not had all the fibre removed back to where the said knife and ginning roll cooperate, said means including a brush which lays out the fibre in a direction opposite to that of the rotation of said ginning roll thereby aiding said ginning roll to more readily grasp said cotton fibre.

21. Means for removing cotton fibre from the seed including a member having a virtually flexible edge cooperating with a friction surface and a brush for placing said fibres in a given position relative to said edge and said friction surface.

22. Means for removing cotton fibre from the seed including a knife having a virtually flexible operating edge, a friction surface cooperating therewith and means for brushing out the fibres so they can be acted upon to better advantage by said knife and said ginning roll.

HERBERT CROSS.
ANDRÉ KORONSKI.